H. WACHENHEIMER.
LOCKET.
APPLICATION FILED APR. 15, 1919.
1,342,035. Patented June 1, 1920.
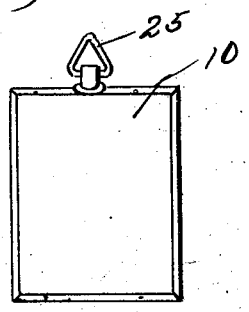
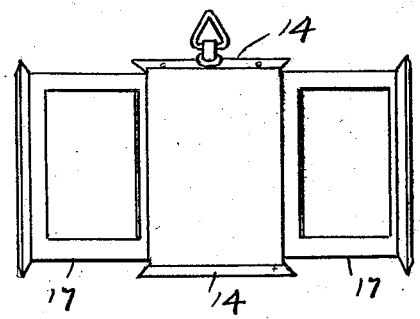
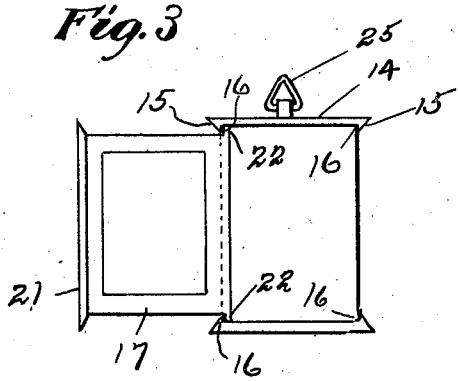
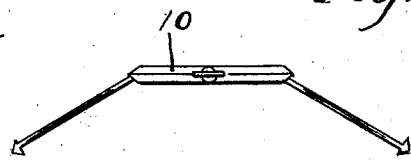
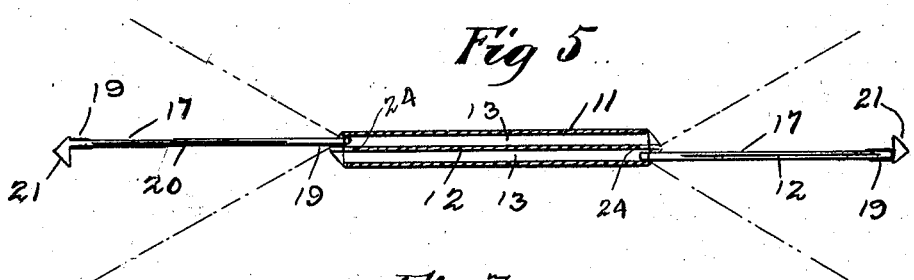
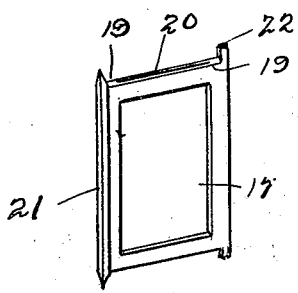
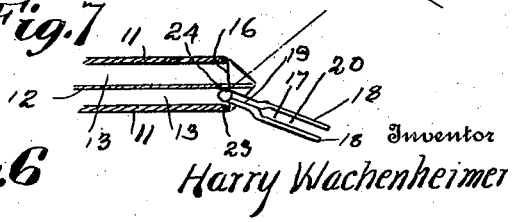
Inventor
Harry Wachenheimer
By Howard E Barlow
Attorney

UNITED STATES PATENT OFFICE.

HARRY WACHENHEIMER, OF PROVIDENCE, RHODE ISLAND, ASSIGNOR TO THE FIRM OF WACHENHEIMER BROS., COMPRISING JACOB WACHENHEIMER, SAMUEL WACHENHEIMER, BOTH OF NEW YORK, N. Y., AND HARRY WACHENHEIMER, OF PROVIDENCE, RHODE ISLAND.

LOCKET.

1,342,035.      Specification of Letters Patent.      Patented June 1, 1920.

Application filed April 15, 1919. Serial No. 290,250.

*To all whom it may concern:*

Be it known that I, HARRY WACHENHEIMER, a citizen of the United States, and resident of Providence, in the county of Providence and State of Rhode Island, have invented certain new and useful Improvements in Lockets, of which the following is a specification.

This invention relates to lockets and analogous articles of jewelry.

The object of this invention is to provide an improved form of locket casing in which one or more frames adapted to carry pictures or other articles, are slidably mounted to be withdrawn from the casing to expose the contents of the frame.

A further object of this invention is the provision of means on the slidable frames whereby they may be swung at an angle to the plane of the casing for the purpose of providing a suitable rest or base on which the device may stand.

With these and other objects in view, the invention consists of certain novel features of construction, as will be more fully described, and particularly pointed out in the appended claims.

In the accompanying drawings:

Figure 1— is a side elevation of the device which is shown as being more particularly adapted for use as a locket; and showing the frame members housed in the casing.

Fig. 2— is a front view showing the frame members as extended from the casing.

Fig. 3— shows one of the sides of the locket as removed and illustrating one of the frames in extended position and showing the pivot pins on the frame in engagement with the stop lips on the casing.

Fig. 4— is an edge view showing the frame members extended one swung off at an angle to the plane of the casing to provide an angular supporting base.

Fig. 5— is a sectional view through the casing, showing the frame in extended position.

Fig. 6— is a perspective view showing one of the frame members removed.

Fig. 7— is an enlarged view showing a portion of the casing and of a frame member, illustrating the structure whereby it is possible to swing the frame member in either direction at an angle to the face of the casing.

Referring to the drawings, 10 designates the locket casing which is preferably formed of two side members 11 between which is mounted a spacer or dividing member 12 so as to form two separated pockets 13 in the casing. The top and bottom portions 14 of each side member of the casing are offset inwardly and have their ends 15 beveled backwardly or formed on an incline, the inner edges of which incline provide a stop-lip 16 to limit the outwardly sliding movement of the frames, presently described. These halves of the casing together with the spacer member between them may be connected by rivets, solder, or other suitable fastening.

The frame member 17 is formed preferably of two thin sheets of metal 18, see Fig. 7, which are connected together at their opposite side edges 19 leaving a space or opening 20 between them at the top through which the picture may be inserted. The outer or free edge of this frame member is provided with a flange 21 which extends slightly both above and below the frames and is adapted to close the opening edge of the casing when housed therein. The opposite inner edges of each frame member are provided with pivots or extending portions 22 forming pivot pins on which the frame may swing when these pins bring up against the stops 16 on the edge of the casing.

It will be noted that this stop lip 16 is approximately flush with the adjacent edge of the sides of the casing and that the inner edge of the casing is beveled as at 23, see Fig. 7, to permit a free swinging movement of the frame in one direction and the edge 24 of the spacer-member 12 is cut slightly back from the edge of the stop 16 to permit a free swinging motion of the frame in the opposite direction.

By this construction it will be seen that the frame members may be swung either forwardly or backwardly out of the plane of the casing whereby an angular base is provided on which the device may stand for the purpose of displaying the pictures mounted in the frames.

In order to cause the sliding frames to be firmly retained in their case when housed therein I have enlarged the sides of the frame near the outer edge at 19 under the flange, whereby when pressed into the casing the sides will grip and bind the side walls of the casing and so prevent the frame from moving from closed position except when being pulled out by the hand of the user.

By the use of my improved locket either two, four or other convenient numbers of pictures or similar articles may be displayed and the frames arranged to also form an ornament for a desk or table and when not in use as a desk ornament the whole may be readily folded up into small compass to take the minimum amount of room.

On this casing I have mounted an eye member 25 whereby the device may be attached to a chain and serve as a watch charm.

The foregoing description is directed solely toward the construction illustrated, but I desire it to be understood that I reserve the privilege of resorting to all the mechanical changes to which the device is susceptible, the invention being defined and limited only by the terms of the appended claims.

I claim:

1. A locket having a body portion with spaced-apart side walls and open at its side edge, a frame slidably mounted in the space between said walls and having extending hinge pivots on its opposite ends, and upper and lower stops at the open edge of the casing to engage said hinge pivots and limit the outward movement of said frame, the side walls of said casing being set back in line with said stop edges to permit the frame to freely swing at an angle to the plane of the casing when in extended position to provide an angular supporting base therefor, said body having an eye member by which it may be suspended.

2. A locket having a body portion with spaced-apart side walls and normally open on its opposite side edges, a pair of oppositely slidable frames in said casing, each having a flange on its free edge adapted to close its side of the casing when housed therein, each of said frames also being provided with hinge pivots in its opposite ends, stop lips formed at each open edge of the said casing to engage the hinge pivots of its frame to limit the outward movement thereof and the adjacent edges of the side walls being cut away flush with said stops to permit of a free swinging action of the frames from the plane of the casing whereby an angular supporting base may be provided, said body having an eye by which it may be suspended.

In testimony whereof I affix my signature.

HARRY WACHENHEIMER.